United States Patent [19]

Jones

[11] 4,386,273
[45] May 31, 1983

[54] POSITIONER AND SLITTER FOR LAMINAR MATERIAL

[75] Inventor: Robert F. Jones, Westfield Center, Ohio

[73] Assignee: The B. F. Goodrich Company, New York, N.Y.

[21] Appl. No.: 145,299

[22] Filed: May 1, 1980

[51] Int. Cl.³ .................. B65H 35/02; B65H 23/02
[52] U.S. Cl. ................................ 250/548; 250/557; 83/74
[58] Field of Search ................. 250/548, 557, 211 K

[56] References Cited

U.S. PATENT DOCUMENTS

| | | | |
|---|---|---|---|
| 3,912,193 | 10/1975 | Calvaer | 250/548 X |
| 4,077,579 | 3/1978 | Seleski et al. | 250/548 X |
| 4,157,477 | 6/1979 | Kall et al. | 250/548 |
| 4,184,080 | 1/1980 | Massey | 250/548 |

OTHER PUBLICATIONS

Shintani, "IEEE Transactions on Industrial Electronics and Control Instrumentation", May 1979, pp. 70-74.

Primary Examiner—David C. Nelms
Assistant Examiner—Darwin R. Hostetter
Attorney, Agent, or Firm—Alfred D. Lobo; Michael J. Colitz, Jr.; Joseph A. Powell

[57] ABSTRACT

A device is disclosed in which an edge-sensing means ("sensor") and a work-performing assembly are combined to perform work on a belt, strip or other work (hereafter "material"). It may be desired to slit the material, or simply position it with respect to a reference mark, but whichever the work-performing function to be discharged, it is required to do so with accuracy relative to one or both edges of the material. The sensor comprises a silicon solar cell ("cell") and a light source ("lamp") between which an edge of the material is sensed, and the deviation from a reference position measured. Depending upon the area of the cell exposed to light from the lamp due to the variable placement of an edge of the material as it traverses the cell, an electrical current is generated in the cell which current is directly proportional to the area of the cell upon which the light falls. The current generated as a result of such sensing is processed through suitable electric circuit means to initiate or control the functioning of the work-performing assembly which includes a work-positioning (or guiding) means, and may typically also include a cutter or slitter.

In one embodiment, the device comprises a sensor which senses one edge of a moving strip which is not transparent to light from the lamp, and circuit means to produce an error output signal corresponding to the deviation of the edge from a reference mark on the sensor. This signal is used to control a drive means which in turn controls a positioning means for positioning the strip so as to minimize the deviation, thus enabling the sensed edge to be accurately positioned along a reference line. For example, a moving belt such as is used under the tread of a tire, is continuously cut along a desired line which is presented to a cutter blade. Alternatively, a combined work-performing assembly including a combination work-positioning and pressure exerting means such as a guide-pressure-roller may position and press a belt or tread onto a tire carcass.

In another embodiment, a rubber sidewall strip is positioned along a reference line on a tire carcass. In still another embodiment, both edges of a moving pre-cut length of tire belt or tread are sensed by a pair of oppositely disposed sensors, and an error output signal is generated in direct proportion to the offset of the belt or tread relative to reference marks over the cells in the sensors. Positioning means, responsive to the magnitude of the error output signal, and the indicated direction in which the belt or tread is transversely displaced, continuously position the belt or tread so that its center line is maintained in a reference position.

23 Claims, 9 Drawing Figures

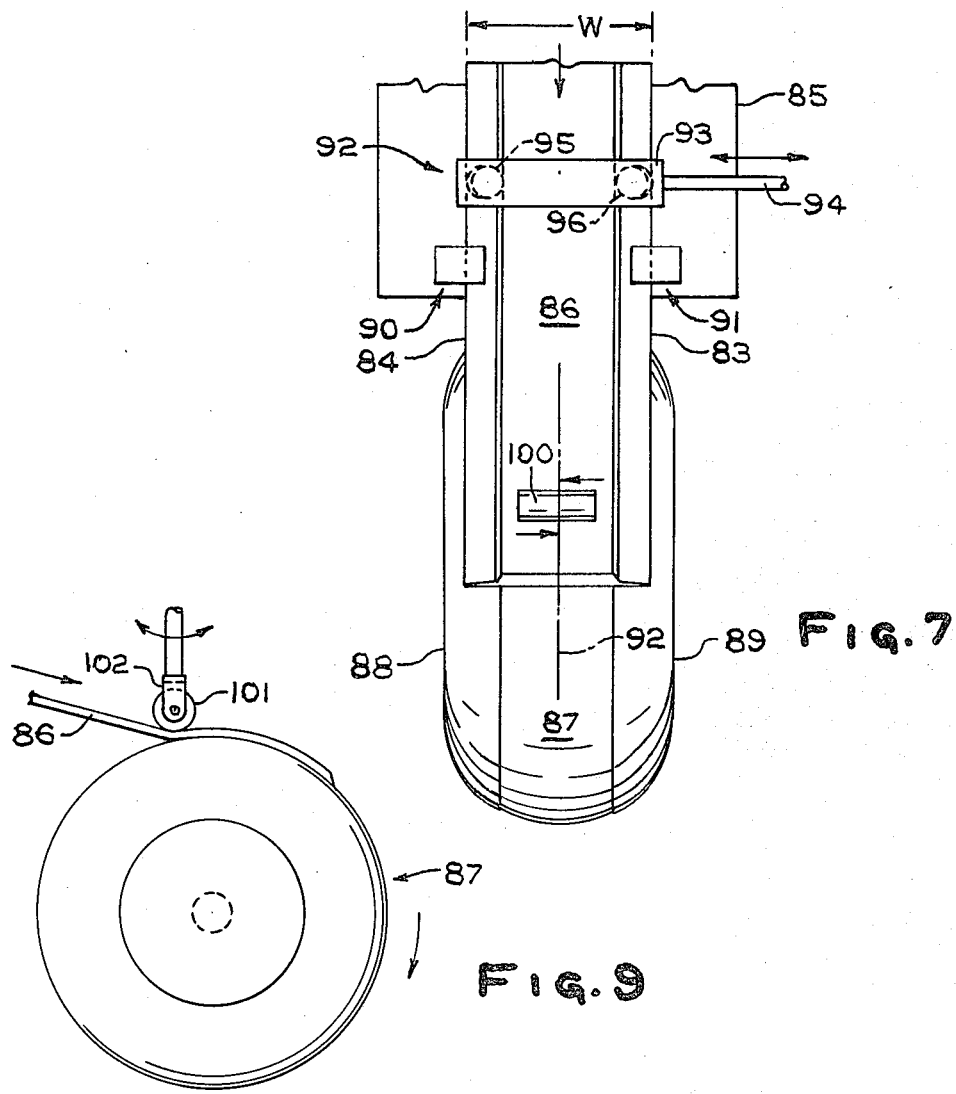
FIG. 7
FIG. 9
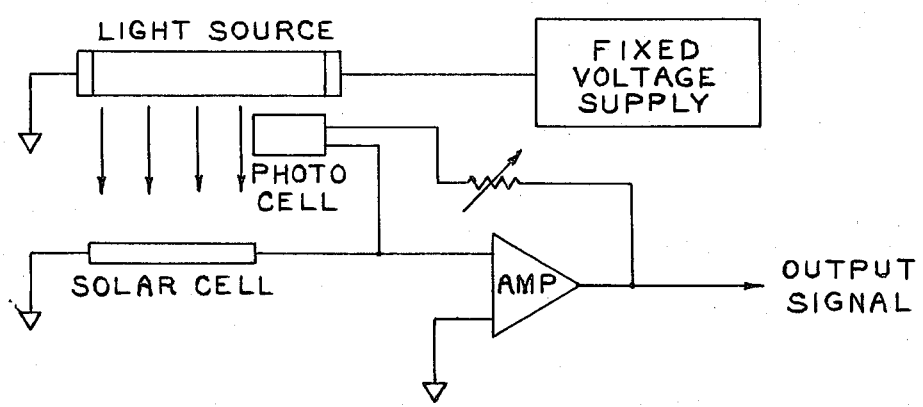
FIG. 8

POSITIONER AND SLITTER FOR LAMINAR MATERIAL

BACKGROUND OF THE INVENTION

There are numerous instances where the width of a belt, strip or other generally laminar work (hereafter "material" for brevity) needs to be monitored, not so much to determine what the precise width of the material actually is, but to position the material properly for some specific purpose. Guiding and positioning material is especially important if it is to be cut or otherwise treated. For instance, before carpeting and wall paper coverings are rolled for shipment, they are cut into predetermined widths in devices such as are disclosed in U.S. Pat. Nos. 2,910,122 and 3,073,197; in another apparatus described in U.S. Pat. No. 3,614,445 beta rays are used to determine width variations of films or strips of synthetic resinous materials which are edge-trimmed before they are formed into bags; and, various mechanical and optical means are used in devices in which excess rubber forming at edges of calendered fabric is trimmed; or, rolls of calendered rubberized material are slit into continuous belts of predetermined width before they are used to build an automobile tire. It is in the field of building tires that this invention is of particular interest.

The invention comprises an apparatus which includes at least one active edge-sensing means (referred to herein as a "sensor") for sensing at least one edge of a material, a suitable electric circuit means to provide an output signal derived from current generated in the sensor, and positioning means for positioning the material, which positioning means are controlled by a drive means as a direct result of the receipt by said drive means of the output signal. The sensor comprises (i) a silicon solar cell (also referred to as an "eye" or "cell") which generates current upon exposure to light (ii) a light source ("lamp") to provide the light, and (iii) a suitable electrical circuit means to measure the magnitude of a transmitted current generated within the cell when a portion of it is exposed to light.

Although the characteristic properties of a solar cell are well known, these characteristics have never been successfully utilized to provide the specific function of positioning a material by sensing at least one of its edges, by those persons who needed such a system. Moreover, nothing about these characteristics suggested that extreme accuracy could be obtained with so reliably rugged and compellingly simple a system.

Photoresistors, and photopotentiometers or photobridges are photoelectric sensors which have been disclosed in many devices used in the field of monitoring widths of material for different purposes. These devices are "passive" devices and none of these prior art devices utilizes a solar cell which is unique in that it alone generates an electric current when it is exposed to light. Moreover the response of a solar cell is unique in that it is essentially linear. By "linear" is meant that a unit increment of current generated in the cell for each unit increment of light falling upon it, is constant. Stated differently, the amount of current generated in the cell, is directly proportional to the area of the cell exposed to the light. Since the light falling upon the cell is proportional to the light intensity, it is critical that the light be substantially uniform per unit of area. In order to obtain a constant overall light intensity, a feedback circuit may be used to adjust the lamp current. In an alternative configuration, the light intensity is permitted to vary and a feedback circuit is used to modify the circuit. This assures constant signal per unit area of cell exposed to the light.

In an article captioned "Analog Sensing of Displacement Using Silicon Solar Cell", by Haruo Shinatani, in *IEEF Transactions on Industrial Electronics and Control Instrumentation,* Vol. IECI-26, No.2, May 1979, a silicon solar cell is used for an optical sensing displacement in an analog form, and an application to a pressure gauge is given. The sensor consists of a set of lamp and cell with a lamp-control circuit, where a shutter interrupts the light beam. The principle of operation, linearity, temperature effect, frequency response, and associated circuit design are presented in a description which is incorporated by reference as if fully set forth herein. From the discussion of linearity, it will now be evident that prior art devices using sensors which do not include a solar cell, are not linear but exponentially responsive to light falling upon them.

SUMMARY OF THE INVENTION

It has been discovered that a solar cell ("cell") may be used in combination with a uniform and constant light source ("lamp"), as an edge-sensing means (also "sensor" for brevity) for one or more edges of an elongated preferably laminar work such as a belt or strip (hereafter "material") which is not transparent to light from the lamp, that is, at least partially light-impermeable. The effectiveness of this sensor depends upon using a silicon solar cell which has a linear response to light falling upon it, and a lamp which is necessarily substantially uniform. By "uniform" I refer to uniformity of illumination across the area of the cell, at any level of intensity of light. In addition to being uniform, it is essential that the light either (a) be substantially constant in intensity, or (b) a feedback circuit be used to modify the gain of an amplifier in the circuit to compensate for changes in the intensity of the light. Under such conditions, the signal generated from the cell current is directly proportional to the area of the cell exposed to the light. However, when signals from similar solar cells are to be compared using the same circuit, the foregoing conditions are unimportant since they affect each cell to the same extent.

The apparatus of this invention may be used to detect the passage of a material, and to locate (i) one edge of the material relative to a reference position, or reference mark on the sensor (over the cell), or, (ii) both edges of the material relative to reference marks on oppositely disposed sensors which monitor each edge, whether the material is moving or not. The sensor comprises a cell oppositely disposed from the lamp positioned so that an edge to be monitored is interposed between the cell and the lamp. Depending upon the area of the cell exposed to light from the lamp, because of the variable placement of the edge sensed as the material traverses the cell, an electric current is generated by the cell, which current is directly proportional to the area of the cell upon which light uniformly falls. The current generated as a result of such sensing is processed through appropriate circuit means to produce an output signal correlatable to the deviation of an edge relative to a reference position.

It is therefore a general object of this invention to provide an apparatus which measures the deviation (I) of a material or (II) of an edge of a material from a reference position, and which positions the material. The apparatus comprises (A) a single sensor to measure deviation of a single edge of a material from a reference position or from a reference mark on a sensor for the edge, or (B) a pair of sensors to measure deviation of opposite edges of the material from reference marks on opposite cells.

It is also a general object of this invention to provide an apparatus comprising a primary work-performing function (positioning) means, and a secondary work-performing function (cutting or pressing) means, including (a) a single sensor which senses only one edge, and positioning means for positioning that edge relative to a reference position, or, (b) two sensors, each of which senses different edges of the material, and positioning means for positioning the material's center line upon a reference line.

It is a specific object of this invention to provide an apparatus for slitting a moving belt to a predetermined width by trimming a portion near one edge, comprising a single sensor to locate one edge of the belt, circuit means for obtaining an error output signal indicating the deviation of the edge from a reference position, positioning means for continuously repositioning the belt along the reference position to minimize the deviation, and a stationary work-performing assembly including a slitter assembly to trim the belt. Alternatively, the position of the belt is maintained unchanged and the work-performing assembly is repositioned.

It is another specific object of this invention to provide an apparatus for slitting a moving belt along its center line, comprising two sensors, a first sensor to locate one edge of the material, and a second sensor to locate an opposite or second edge, means for comparing signals from the two sensors to obtain the deviation of the material's center line from a reference position, positioning means for continuously repositioning the material so as to minimize the deviation, and a work-performing assembly including a slitter assembly to slit the material along its center line.

It is also a specific object of this invention to provide an apparatus for positioning at least one rubber sidewall strip having an easily deformable or "soft" edge, on the carcass of a tire, so that the soft edge is positioned along a reference line on the carcass, comprising, a single sensor for the soft edge, circuit means for obtaining the deviation of the soft edge from the reference line, a primary work-performing assembly including a positioning means for positioning the soft edge along the reference line to minimize the deviation, drive means to effect movement of said positioning means, and a secondary work-performing assembly including a pressure roller to impress the sidewall strip onto the carcass.

It is a further specific object of this invention to provide an apparatus including a combined work-performing assembly ("guide-pressure-roller") including combined primary and secondary work-performing assemblies, which guide-pressure-roller positions and impresses a laminar material on a body. The apparatus comprises a pair of sensors, each of which senses opposite edges of the material, and each sensor generates an output signal which signals are compared to obtain the deviation of the material's center line from the reference center line of the body, and the guide-pressure-roller positions and presses the material onto the body so that the net deviation of the two center lines is, or approaches zero.

BRIEF DESCRIPTION OF THE DRAWINGS

FIG. 7 is a plan view schematically illustrating a pair of sensors sensing opposite edges of a moving tire tread which is to be positioned with its center line superimposed upon the center line of a tire carcass, so the tread is centered accurately upon the carcass though the width of the tread may vary.

FIG. 8 is an electrical control circuit schematically illustrating the amplification and transmittance of current generated by the solar cell in FIG. 1, to provide an output signal which is compared to a reference value (as in FIG. 1) to produce an error output signal used to actuate a drive means for effecting transverse relative movement of the belt and the cutter blade of the slitter assembly.

FIG. 9 is a side elevational view schematically illustrating a guide-pressure-roller which positions a belt or tread onto a tire carcass and then presses the belt or tread onto the carcass.

DETAILED DESCRIPTION OF PREFERRED EMBODIMENTS

In one particular embodiment, this invention comprises a device including a sensor, and means for trimming a longitudinal portion from a sheet material of arbitrary length, for example, a moving belt, or strip, or other generally elongate work (hereafter "material" for brevity), which is not transparent to light. By "transparent" I mean that the material cannot be essentially completely permeable to light from the sensor's lamp, otherwise the sensor's cell would fail to sense which portion of its surface was covered by the material, and which portion was exposed to the light.

As often happens, an over-wide belt having one straighter or 'better' edge than the other is required to be trimmed to a specified width, and the width so specified is desirably referenced to the better edge. This specified width is obtained in the apparatus of this invention by maintaining a constant distance between a reference line on a sensor for the better edge (a mark is made over the sensor's cell), and a parallel line through the edge of a cutter blade. This constant distance is maintained by a positioning means responsive to an error output signal derived from current generated in the cell and corresponding to the deviation of the edge from the reference line, as sensed by the cell (hence "sensed edge"). The positioning means positions the edge so it is continuously superimposed on the reference line. The magnitude of the deviation signal (error output signal) is proportional to the magnitude of the deviation of the sensed edge from the reference line. The sign of the error output signal corresponds with the direction of the deviation. It is this error output signal which is used with suitable positioning means to provide a work-performing function, namely positioning the material.

Additional work-performing functions may be provided, for example, cutting or perforating the material, pressing the material onto a body, or combinations of such functions. Where, for example, the material is to be cut, either the material is moved, or the cutting means is moved, it being only necessary that the requisite relative transverse movement is effected.

Figure 1:
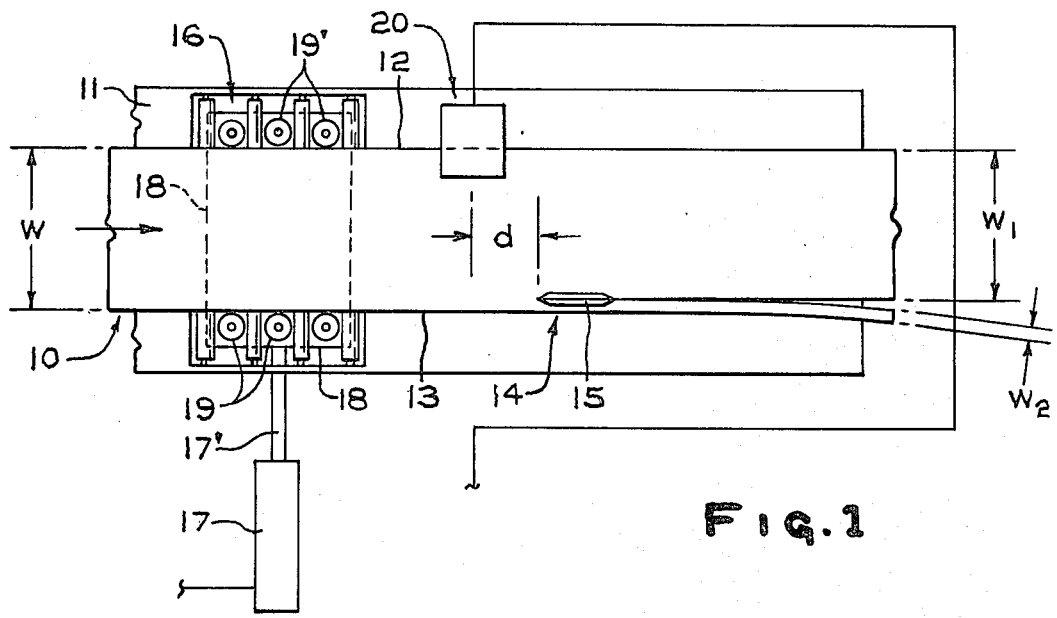
FIG. 1 is a plan view schematically illustrating a moving belt which is to be trimmed to a specified width by sensing one edge of the belt, and using a positioning means to position the belt to be cut by a cutter blade of a slitter assembly.

Referring now to FIG. 1 there is diagrammatically illustrated a moving belt indicated generally by reference numeral 10, as it travels longitudinally (x-axis direction) along the surface of a feed-table or feed-tray 11. The belt 10 has a width W which varies between its edges 12 and 13, the edge 12 being generally more linear, that is straighter or "better" than edge 13. It is desired to trim belt 10 and obtain a constant width $W_1$ with reference to the better edge 12 using a slitter assembly indicated generally by reference numeral 14 which is positioned above the belt, near one end of the feed-tray 11. The slitter assembly includes a cutter blade 15 which is placed in cutting engagement with the belt 10, so that the belt is continuously trimmed to the desired width $W_1$, the remaining trimmed longitudinal portion having a varying width $W_2$.

The desired width $W_1$ is obtained by using a movable positioning means, indicated generally by reference numeral 16, the movement of which is controlled by a conventional servomechanism drive means (not shown) including a fluid-actuated cylinder 17 responsive to a signal derived from a current generated in a sensor indicated generally by reference numeral 20 in FIG. 1. The current is processed in a circuit means such as one illustrated in FIG. 8, to obtain an output signal. The magnitude of the output signal is proportional to the area of the cell exposed to the light, provided the light is uniform. The output signal is compared in a separate amplifier (not shown) to obtain the difference between the output voltage and a fixed voltage corresponding to one-half of the area of the cell, if the reference line bisects the cell. After this comparison, the signal obtained is a "deviation signal" or "error output signal" which is transmitted to the servomechanism which hunts for the null point. The positioning means 16 includes a support platform 18 which carries sets of guide pins 19 and 19'. The belt 10 rests on the platform 18 which is substantially coplanar with feed-tray 11, and the platform can be transversely displaced (y-axis direction) in the horizontal x-y plane by extension and retraction of rod 17' of the fluid-actuated cylinder 17, while the belt moves in the longitudinal direction.

Since the desired width $W_1$ is to be measured relative to the better edge 12, this edge is the one sensed by sensor 20. The sensor 20, illustrated in cross section in the front view seen in FIG. 2 (as viewed facing the end of the table), comprises an upper housing 21, a lower housing 22 and an end housing 23. The lower housing is provided with a channel 24 into which a longitudinal rib 25 of the upper housing snugly fits so as to ensure desired relative positioning of the upper and lower housings, and to define a belt accepting slot 26 through which the edge 12 of the belt 10 moves. A fluorescent lamp 30 is housed in the upper housing with its electrical leads 31 connected to a pin socket 32 mounted on end housing 23. The lamp 30 is preferably operated on direct current. Alternating current causes oscillation of the intensity of the light source which in turn causes oscillation of the error output signal from the solar cell. Of course alternating current may be used if the oscillation of error output signal is accepted and accomodated with suitable circuitry. Light sources other than a lamp may be used, for example a light-emitting diode (LED). However, because of the low level of illumination provided by a LED it is desirable to use plural suitably matched LEDs which together provide a substantially uniform and constant light source. Light from the light source 30 is directed through a light-slot 33 in the upper housing, as is seen in FIG. 3.

Figure 2:
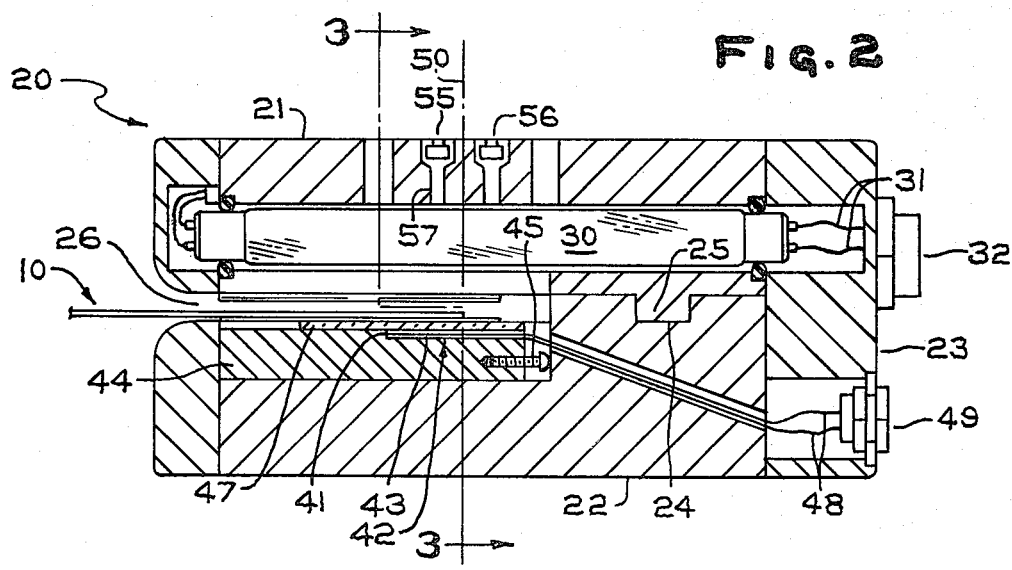
FIG. 2 is a cross-sectional front elevational view of the sensor used in this invention showing the relative position of the soft edge of the sidewall strip to be positioned, and details of the sensor including a lamp and a solar cell.
Figure 3:
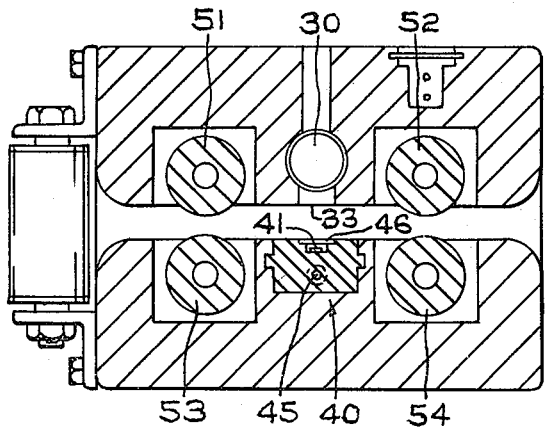
FIG. 3 is a cross-sectional side elevational view along the line 3—3 in FIG. 2 showing details of construction of the sensor.

Referring further to FIGS. 2 and 3 there is shown a cell assembly indicated generally by reference numeral 40, mounted directly beneath the lamp 30. The cell assembly comprises a silicon solar cell 41 which is generally of elongated rectangular shape. The cell 41 is placed with its collector 42 downwards, that is, the collector lies against the surface of a cell-bed 43 cut as a rectangular cell-accepting cavity in a block 44. An adjustment screw 45 allows lateral movement of the block 44, so that by turning the screw, the cell 41 may be horizontally advanced or retracted in a (y-axis) direction at right angle to the direction of travel (x-axis) of the moving belt. A reference light 50 is marked on the upper surface of the upper housing 21 so that the reference line bisects (say) the cell 41. The reference line 50 is the line upon which the edge 12 is superimposed so as to maintain the reference position of the belt. As long as the sensed edge 12 is superimposed on reference line 50 the output signal generated by the circuit means due to exposure of the cell, as is described in more detail hereinbelow, will be constant. A larger or smaller output signal is generated depending upon the extent to which the sensed edge 12 deviates from the reference line, that is, from one-half of the area of the cell exposed to the lamp. A protective transparent glass cover 47 covers the light-sensitive surface of the cell to protect it against abrasion by the sensed edge 12 of the belt. Cell leads 48 are connected to a pin socket 49, which like the pin socket 32 is mounted on the end housing 23 (see FIG. 2).

It is essential that the cell be linear, that is a unit increment of current generated in the cell is always the same for each unit increment of light falling upon the cell. In addition, the cell is one in which the current is essentially constant or 'flat' over the usual operating temperature range of the sensor. The ambient operating temperature range in a tire making plant, for example, may range from about 50° F. to about 110° F., depending upon the location of the sensor in the plant, and prevailing weather conditions. The usual operating temperature in the immediate vicinity of the cell may be considerably lower or higher than ambient, depending upon the amount of heat from the lamp, and whether the belt material is cool or warm. The characteristic of flat response despite changes in temperature within the usual operating range of the sensor is easily obtained in conventional cells. As seen in FIG. 3 under the section titled "Design Data" in Technical Bulletin SS-1000 published by Silicon Sensors, Inc., commercial cells such as the SS-50 provide the desired flat response relative to temperature changes. The SS-50 has overall dimensions of about 0.5 cm×2.5 cm, and a power output of 6.0 mw. As will now be recognized, other photosensitive devices for measuring width do not generate a current, are far from linear, and are not flat in response relative to changes in the usual temperature range.

The distance 'd' between the "eye" 20 and the cutting edge of the cutter blade 15 is not critical but it will be evident that the greater the distance 'd' the more likely is the introduction of error due to the difficulty of transporting the belt from the eye to the cutting edge in an essentially straight line. Therefore it is preferable to locate the eye as close to the cutting edge as is practical.

To facilitate movement of the belt 10 through the sensor 20 it is provided with upper rollers 51 and 52 in the upper housing 21, and lower rollers 53 and 54 in the lower housing 22, all of which rollers are rotatable about the y-axis, that is at right angle to the longitudinal center line of the belt 10.

The upper housing is also provided with one or more photocell or solar cell ("feedback cell") cavities 55 in each of which a feedback cell 56 is placed to provide a feedback circuit. This feedback circuit may be used to compensate for variations in intensity of the lamp due to changes in line voltage, ambient temperature, or simply aging of the fluorescent lamp. Each feedback cell cavity 55 is provided with a short through-passage 57 which places the feedback cell 56 in light-receiving communication with the lamp 30. A light-adjusting screw (not shown) can partially or fully block light received by the feedback cell 56. Since the output signal from each cell 41 is to be kept directly proportional to the area of the cell exposed to light, feedback signals from the feedback cells 56 monitor the light intensity and change the gain of the circuit (as shown in FIG. 8). A feedback circuit may also be used to modify the lamp current in order to minimize change in the light intensity, such as for example illustrated in my copending patent application Ser. No. 141,862 (FIG. 12), or in *Shintani*, supra.

In the foregoing embodiment, the error output signal is transmitted to the positioning means which is movable, while the cutter assembly is stationary. As an alternative, the error output signal may be transmitted to a movable cutter assembly which is movable transversely in relation to the longitudinal direction of the advancing belt, and the positioning means is held stationary. If this alternative configuration is used, the belt is guided between guide-rollers which are spaced at a guide-spacing sufficient to guide the sensed edge or better edge, along the reference mark on the solar cell of a fixed sensor. With a tire belt which is reinforced with angled wire strands, there is a natural bias of the belt towards one guide-roller so that the sensed edge guided by the guide-roller, is kept on the reference mark on the solar cell even if the width of the belt varies from the nominal width, and if the belt width is less than the guide-spacing of the guide-rollers. If the material is a fabric, metal or non-metal strip, or other generally laminar material which does not provide a natural bias towards the guide-roller which guides the material's sensed edge along the cell's reference mark, any conventional biasing means may be used to bias the material against that guide-roller.

It will now be evident that once the work of positioning the material relative to a reference position has been performed, as explained hereinabove, any other additional work, other than, or including cutting the material, may be performed on the positioned material. For example, after a tire belt is positioned on a tire carcass, with the longitudinal center line of the belt superimposed upon the central circumferential line of a tire carcass, the belt is pressed onto the carcass with another work-performing means (in addition to the work-positioning means) such as, for example, a pressure roller (not shown in FIG. 1).

Figure 4:
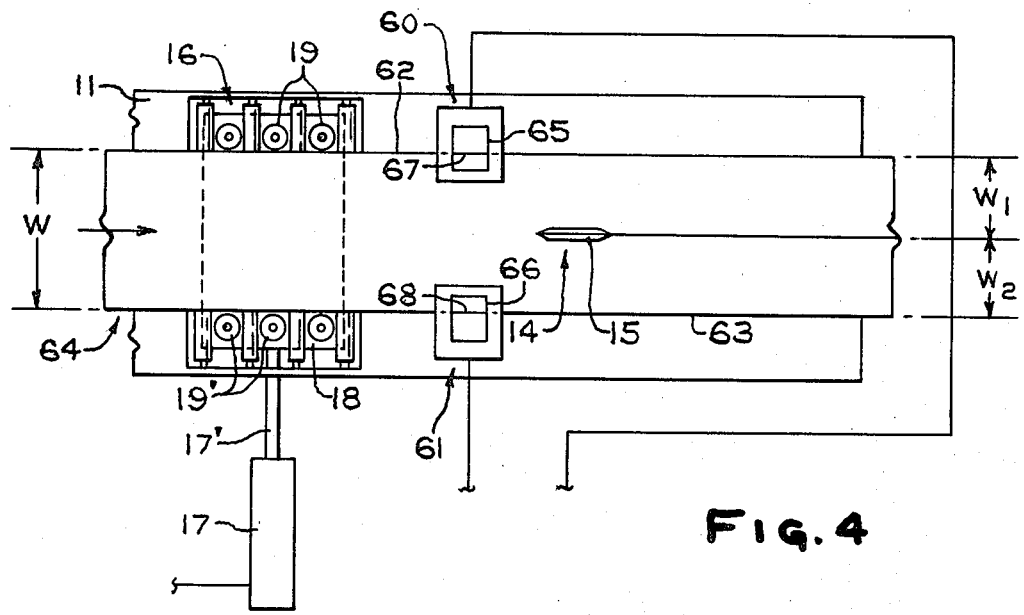
FIG. 4 is a plan view of a pair of sensors, oppositely disposed, to monitor the width of a moving belt, and to place the longitudinal center line of the belt against the edge of a cutter blade of a slitter assembly so that the belt is always bisected accurately though its width may vary.

Referring now to FIG. 4 there is diagrammatically illustrated in a plan view, a first sensor 60, and a second sensor 61, used to sense the edges 62 and 63 of a belt 64 which is to be positioned with reference to a reference position, and thereafter slit along its longitudinal center line by a slitter assembly indicated generally by reference numeral 14 positioned over a table 11 in a manner analogous to that illustrated in FIG. 1. The width W of the belt 64 varies within predetermined limits, but it is essential that the slit portions have widths $W_1$ and $W_2$ which are equal on each side of the cutter blade 15 as the belt is being longitudinally bisected. Sensor 60 is provided with a first solar cell assembly 65, and sensor 61 is provided with a second solar cell assembly 66 in a manner analogous to that described in FIGS. 2 and 3 hereinbefore. A first reference line 67 is marked corresponding to a line which divides the longitudinally disposed rectangular solar cell bedded in the first solar cell assembly 65, and a second reference line 68 is marked corresponding to a line which divides the longitudinally disposed rectangular solar cell bedded in the second solar cell assembly 66. The distance between the reference lines 67 and 68 corresponds to the mean width W of the belt 64 which is to be halved longitudinally, and the lines 67 and 68 define the reference position.

Figure 5:
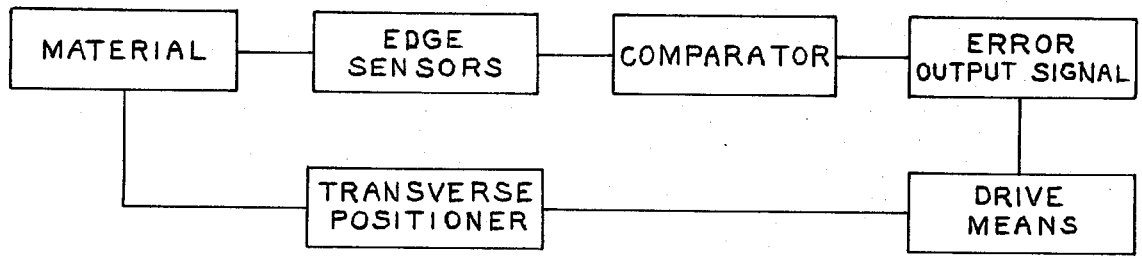
FIG. 5 is a block diagram schematically illustrating the steps for determining and using an error output signal obtained by comparing signals derived from current generated in each of the two solar cells shown in FIG. 4.

Separate control circuits, each like the one illustrated in FIG. 8, process and transmit current transmitted from each of the two sensors shown in FIG. 4, and the output signals from each circuit are compared in a comparator means such as a difference amplifier or other electrical circuit means so as to obtain a combined "error output signal" or "error output signal", as illustrated in block diagram FIG. 5. This error readout signal is transmitted to a drive means (not shown) which either repositions the belt by moving the support platform 18 of the positioning means 16, or as an alternative, if the material is not to be moved transversely, repositions the work-performing assembly transversely to a desired reference position. One skilled in the art will readily recognize and understand the function of each of the elements of the block diagram shown in FIG. 5 and no detailed explanation thereof is necessary. For example, the circuit combining both sensors is adjusted to give (i) zero volts when both solar cells are completely shaded, (ii) 4 volts when one solar cell is completely shaded, and (iii) 8 volts when both solar cells are completely exposed to the light sources above each cell, because the output signals from the sensors are summed. The voltages specified are with respect to specific solar cells in which 8 volts corresponds to exposure of a total length of 5 cm; 4 volts corresponds to exposure of 2.5 cm length; and 1 volt corresponds to exposure of 0.625 cm length. When one-half of each of the solar cells is exposed the output signal is 4 volts which represents the mean material width W of the belt, because the signals are summed; and, the error output signal is zero after the output signals are differenced.

Movement of the belt either to the left or to the right within present limits does not change the indicated width. For example, if the belt is moved to the right by 0.625 cm, then (i) exposed length of the right cell is 0.625 cm (1 volt); (ii) the exposed length of the left cell is 1.875 cm (3 volts) and (iii) the width, if measured, is $1+3=4$ volts. However, the error output signal is $1-3=2$ volts. A change in the width of the belt will be indicated by a change in the sum of the signals transmitted from each solar cell.

The error output signal is fed to a drive means such as the fluid-actuated cylinder 17 which adjusts the support platform 18 transversely, that is, at right angles to the direction of the moving belt, which results in transverse relative movement of the belt with respect to the cutter blade. Since the circuit is designed so that the servomechanism hunts for the null point to minimize the error output signal corresponding to equal widths $W_1$ and $W_2$ of the slit belt, the drive means moves the belt transversely in whichever direction is necessary to minimize the error output signal, thus assuring that the belt is slit along its center line irrespective of actual variations in the width W.

As schematically illustrated in the block diagram FIG. 5, th circuit processes the transmitted current from each solar cell and sums the currents in a comparator to obtain an error output signal indicating the deviation of both edges of the belt from their reference position. It is this error readout signal, suitably amplified and processed, which actuates a drive means which in turn effects the desired relative displacement of the belt and slitter assembly so that the belt is always slit along its longitudinal center line.

Figure 6:
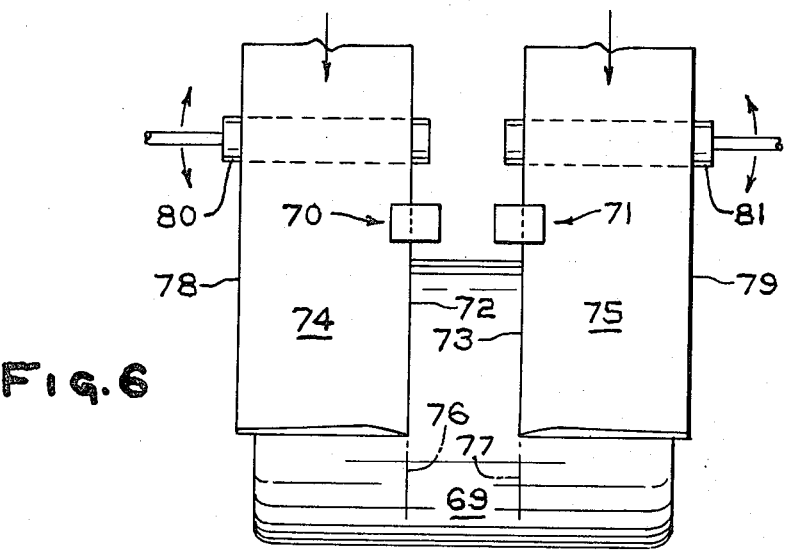
FIG. 6 is a plan view schematically illustrating a pair of oppositely disposed sensors, each sensing one edge of a moving tire sidewall strip a predetermined portion of which is to be wrapped around an end of a tire carcass, but each sensed edge is to be positioned accurately relative to a reference line upon the carcass before the sidewalls are pressed onto the carcass.

Referring now to FIG. 6, there is schematically illustrated in plan view, a tire carcass 69 which is rotatably mounted on a support mechanism (not shown). A pair of sensors 70 and 71 are used to monitor the inner edges 72 and 73 of sidewall strips 74 and 75 respectively, which are to be positioned on the carcass 69 while the sidewall strips are simultaneously advanced longitudinally (along the x-axis) from a feed-tray (not shown). It is desired to position edge 72 on a reference line 76 on the carcass, and to position edge 73 on a reference line 77 on the carcass, it being non-critical where outer edges 78 and 79 may fall relative to the reference lines.

The work-performing function of positioning the sidewall strips is performed by rotatable cylindrical guide-rolls 80 and 81 which directly support the strips 74 and 75 respectively, and are in frictional contact therewith. The rate at which the sidewall strips are advanced depends upon the speed of rotation (about the y-axis) of the carcass which pulls the sidewall stirps onto it. If desired, the guide-rolls 80 and 81 may also be used as drive rolls. Since it is desirable to position the sidewall strips simultaneously, the speed of rotation of the guide-rolls, if used as drive rolls, is equal. If not used as drive rolls, the speed of rotation will be equal if the rolls are of the same diameter, which they are. The axis of rotation of each of the guide-rolls may itself be angulated in the x-y plane so that the net effect is angular displacement of the guide-rolls about the z-axis, as illustrated by the arcuate directional arrows. The effect of any angular displacement of a guide-roll is to "steer" the sidewall strip which it supports.

In a manner analogous with that described hereinabove for the embodiment illustrated in FIG. 4, the sensors 70 and 71 are provided with reference marks (not shown) bisecting (say) each solar cell in each sensor, the reference mark on sensor 70 being aligned with the reference line 76, and the mark on sensor 70 aligned with line 77 on carcass 69.

Each sensor 70 and 71 is provided with a circuit such as the one illustrated in FIG. 8 generates an output signal. The signals are differenced in a difference amplifier to produce an error output signal (also referred to as a deviation signal) in proportion to the magnitude of the deviation of the sensed edge from the reference mark on the solar cell. This output signal is transmitted to a servomechanism drive means (not shown) which effects the necessary angular displacement of a guide-roll to minimize the error output signal transmitted to it, and does so by displacing the sensed edge transversely, that is, along the y-axis, so that the sensed edge at all times is positioned in alignment with the reference line on the carcass corresponding to it.

Referring now to FIG. 7 there is schematically illustrated an inclined tread-feed table or tread-feed tray 85 which is inclined to the horizontal at an angle in the range from about 10° to about 60° so that a tread 86 may be intermittently fed along the tray. A predetermined length of the tread is to be wrapped around and pressed onto an inflated tire carcass indicated generally by reference numeral 87. The tire carcass is mounted for rotation about its transverse (y-axis), and is supported for such rotation on bead-rings 88 and 89 respectively. The object is to wrap the tread around the carcass so that the longitudinal center line of the tread is accurately superimposed upon the center line of the carcass, with edges 83 and 84 of the tread being symmetrically disposed relative to the reference line 92 along the longitudinal axis (x-axis). A pair of fixed sensors 90 and 91 are mounted opposite each other to sense the edges 84 and 83 respectively of the tread before it is placed on the tire carcass.

A positioning means, indicated generally by reference numeral 92 includes a support platform 93 coplanar with tray 85, and the platform has a shaft 94 to effect transverse movement of the platform along the y-axis as indicated by the arrows illustrating to and fro movement. Guide pins 95 and 96 are placed at a guide-spacing corresponding to the maximum expected width of the tread, measured between edges 83 and 84. The positioning means 92 is drivingly engaged with a servomechanism drive means (not shown) which provides the requisite transverse movement of the tread in response to an error output signal generated by the sensors 90 and 91. As before, the error output signal is generated by comparing the signal from one sensor with the signal generated by the other as illustrated in the block diagram FIG. 5. A pressure-roller 100 may be used to press the tread onto the carcass, thus providing a secondary work-performing function. Of course, the requisite pressure may be exerted manually, but it will be evident that the pressure-roller 100 will perform the work function more efficiently. When the tread encircles the carcass, rotation of the carcass is stopped, as is the feeding of the tread. The ends of the tread which have edges cut at a complementary bias are accurately overlapped and manually "stitched" onto the carcass with a disc-roller or 'hand-stitcher'.

Where precise positioning of the edges requires only very slight adjustments in the range from about 1 mm to about 8 mm, it may be preferable to dispense with the positioning means 92 and provide a combined positioning and pressing function in the pressure roller which will now be referred to as a guide-pressure-roller indicated generally in FIG. 9 by reference numeral 101.

As schematically illustrated in the detail view in FIG. 9, the guide-pressure roller 101 is rotatably mounted for rotation about its transverse y-axis in a support frame 102, the axis of rotation of this roller being parallel to the axis of rotation of the inflated carcass, and at a fixed distance from the axis of rotation of the carcass. In addition, the axis of rotation of the guide-pressure-roller 101 is slightly displaced relative to the vertical axis through the axis of rotation of the carcass, so that the tread is in contact with the guide-pressure-roller before it comes in contact with the inflated tire carcass. This relative positioning of the axes of the guide-pressure-roller and the carcass allows the tread to be 'steered', that is, accurately positioned by transmitting a twisting movement to the roller (torque about the vertical z-axis) by angularly displacing the axis of rotation of the guide-pressure-roller 101. This steering of the tread is effective because of the friction between the tread and the guide-pressure-roller. The support frame 102 is drivingly engaged with a servomechanism drive means (not shown) which provides sufficient torque to the guide-pressure-roller 101 to perform the necessary work on the tread, and move it into its preselected position on the tire carcass. The requisite torque provided to the support frame is proportional to the magnitude of the error readout signal generated by the electrical circuit comprising the sensors 90 and 91. It will now be evident that the relative displacement of the vertical axes of the guide-pressure-roller 101 and the carcass 87 is not critical provided the requisite steering action can be effected by the roller before the tread 86 is pressed onto the carcass. For example, even if the vertical axes are aligned, a steering action will be exerted on the tread if it is fed at an angle to the horizontal, which angle, depending upon the thickness of the tread and the relative diameters of the guide-pressure roller and carcass, is sufficient to allow the steering action. As before, the sensors (not shown) are fixedly mounted just ahead of the guide-pressure roller 101, and again, as explained hereinabove, the distance of the sensors from the work-performing guide-pressure-roller 101 is not critical but it is preferred to have the "eyes" as close to the roller as practical to minimize the error which may be introduced due to transfer of the belt from the "eyes" over a substantial distance before the tread contacts the guide-pressure-roller.

I claim:

1. A device for positioning a material relative to a preselected reference position by sensing at least one edge of said material, said device comprising:
    (A) stationary edge-sensing means including
        (i) a substantially linear silicon solar cell for sensing said one edge so as to result in the generation within said cell of an output signal, said edge-sensing means also including,
        (ii) a light source for providing substantially uniform illumination of at least a portion of said cell when said one edge is interposed between said light source and said cell, and
        (iii) electrical circuit means selectively
            (a) to maintain the intensity of said light substantially constant, and
            (b) to compensate for changes in the intensity of said light,
    (B) comparator means to compare said output signal to a reference value so as to obtain an error output signal,
    (C) a work-performing means, including a positioning means for said material, and,
    (D) drive means responsive to said error output signal, to move said material transversely and position it relative to said reference position as it is advanced longitudinally.

2. The device of claim 1 wherein said light source is directly oppositely disposed relative to said silicon solar cell.

3. The device of claim 2 including a control circuit for maintaining said intensity of said light substantially constant.

4. The device of claim 2 including a control circuit to compensate for changes in said intensity of said light so as to provide a constant output signal when a predetermined area of said silicon solar cell is exposed to said light.

5. The device of claim 2 wherein said material is generally laminar and of arbitrary length, and said one edge is positioned relative to a reference position on a rotatable body.

6. The device of claim 2 including in addition, another work-performing means to perform work on said material after it is positioned.

7. The device of claim 2 wherein said work-performing means includes a combination first work-performing means and a second work-performing means, said first work-performing means to position said material, and, said second work-performing means to perform additional work on the material after it is positioned.

8. The device of claim 5 wherein said material is a tire sidewall and said body is a tire carcass.

9. The device of claim 5 wherein said material is a tire belt and said body is a tire carcass.

10. The device of claim 5 wherein said material is a tire tread and said body is a tire carcass.

11. The device of claim 6 wherein said another work-performing means comprises a cutter assembly having a cutter blade for cutting said material located at said reference position.

12. The device of claim 6 wherein said another work-performing means comprises a pressure roller, said material is a tire sidewall and said reference position is located on a tire carcass.

13. The device of claim 7 wherein said combination work-performing means is a guide-pressure roller.

14. A device for positioning a material relative to a preselected reference position by sensing at least one edge of said material and thereafter performing additional work on said material, said device comprising:
    (A) stationary edge-sensing means including
        (i) a substantially linear silicon solar cell for sensing said one edge so as to result in the generation within said cell of an output signal, said edge-sensing means also including,
        (ii) a light source for providing substantially uniform illumination of at least a portion of said cell when said one edge is interposed between said light source and said cell, and
        (iii) electrical circuit means selectively (a) to maintain the intensity of said light substantially constant, and
(b) to compensate for changes in the intensity of said light,
(B) comparator means to compare said output signal to a reference value so as to obtain an error output signal,
(C) a primary work-performing means including a positioning means for said material,
(D) a secondary work-performing means to perform additional work on said material, and,
(E) drive means responsive to said error output signal to effect transverse relative movement between said primary and secondary work-performing means as said material is advanced longitudinally.

15. The device of claim 14 wherein said material is generally laminar and of arbitrary length, said positioning means includes
(i) a support platform which supports said material, and
(ii) fixed guide means spaced apart at a guide-spacing sufficient to guide said one edge along a reference mark on said solar cell for which reference mark said reference value is obtained,
said secondary work-performing means includes a stationary cutter assembly, and,
said positioning means is drivingly engaged with said drive means so that said positioning means can move said material transversely relative to said cutter blade assembly.

16. The device of claim 14 wherein said material is generally laminar and of arbitrary length, said positioning means includes
(i) a stationary support platform which supports said material, and
(ii) fixed guide means spaced apart at a guide-spacing sufficient to guide said material with essentially no transverse movement thereof as it is advanced longitudinally, and to guide said one edge along a reference mark on said solar cell for which reference mark said reference value is obtained,
said secondary work-performing means includes a movable cutter assembly transversely movable relative to said material, and,
said cutter assembly is drivingly engaged with said drive means so that the blade of said cutter assembly is positioned at said reference position.

17. The device of claim 16 including in addition, a biasing means to bias said material against a guide-roller which guides said one edge along a reference mark on said solar cell, for which reference mark said reference value is obtained.

18. A device for positioning a material relative to a preselected reference position by sensing two edges of said material, said device comprising:
(A) a first stationary edge-sensing means for sensing a first edge of said material and a second stationary edge-sensing means for sensing a second edge of said material, each said edge-sensing means including
(i) a substantially linear silicon solar cell for sensing an edge so as to result in the generation which said cell of an output signal, said edge-sensing means also including,
(ii) a light source for providing illumination of at least a portion of said cell when an edge is interposed between said light source and said cell,
(B) comparator means to compare output signals obtained from said first and second edge-sensing means so as to obtain an error output signal,
(C) a work-performing means, including a positioning means for said material, and,
(D) drive means responsive to said error output signal, drivingly engaged with said positioning means to move said material transversely as it is advanced longitudinally, and to position it relative to said reference position so as to maintain essentially zero value for said error output signal.

19. The device of claim 18 wherein said material is generally laminar and of arbitrary length.

20. The device of claim 18 including in addition, another work-performing means to perform work on said material after it is positioned.

21. The device of claim 20 wherein said another work-performing means comprises a cutter assembly having cutting means for cutting said material after it is located relative to said reference position.

22. The device of claim 20 wherein said another work-performing means comprises a pressure roller, said material is a tire sidewall and said reference position is located on a tire carcass.

23. The device of claim 18 wherein said work-performing means includes a combination first work-performing means and a second work-performing means, said first work-performing means to position said material, and, said second work-performing means to perform additional work on the material after it is positioned.

* * * * *